(12) United States Patent
Timmerberg (10) Patent No.: US 9,086,215 B2
(45) Date of Patent: Jul. 21, 2015

(54) WIRELESS ILLUMINATED APPAREL (71) Applicant: Adam Timmerberg, San Diego, CA (US)

(72) Inventor: Adam Timmerberg, San Diego, CA (US)

(*) Notice: Subject to any disclaimer, the term of this patent is extended or adjusted under 35 U.S.C. 154(b) by 181 days.

(21) Appl. No.: 13/834,149

(22) Filed: Mar. 15, 2013

(65) Prior Publication Data

US 2014/0268839 A1 Sep. 18, 2014

(51) Int. Cl.
F21V 23/04 (2006.01)
F21V 33/00 (2006.01)
A43B 3/00 (2006.01)
B60Q 1/00 (2006.01)
B60Q 1/26 (2006.01)
B62J 6/00 (2006.01)

(52) U.S. Cl.
CPC .............. *F21V 33/0008* (2013.01); *A43B 3/001* (2013.01); *B60Q 1/00* (2013.01); *B60Q 1/2673* (2013.01); *B62J 6/00* (2013.01); *B62J 6/005* (2013.01); *B60Q 2900/30* (2013.01)

(58) Field of Classification Search
CPC ........... A42B 3/044; A42B 1/242; B62J 6/00; A41D 27/085; F21V 23/0442
USPC ................ 362/473, 475, 103, 106, 108, 276; 340/468
See application file for complete search history.

(56) References Cited

U.S. PATENT DOCUMENTS

| | | | | |
|---|---|---|---|---|
| 6,406,168 B1* | 6/2002 | Whiting | ........................ | 362/473 |
| 6,686,837 B2* | 2/2004 | Kim | ............................... | 340/479 |
| 6,784,795 B1* | 8/2004 | Pories et al. | .................. | 340/479 |
| 7,109,857 B2* | 9/2006 | Ross et al. | ..................... | 340/479 |
| 7,218,214 B2* | 5/2007 | Werner et al. | ................. | 340/468 |
| 2004/0058722 A1* | 3/2004 | Yang et al. | ................. | 455/575.6 |
| 2008/0089056 A1* | 4/2008 | Grosjean | ....................... | 362/103 |
| 2011/0292667 A1* | 12/2011 | Meyers | ......................... | 362/465 |
| 2014/0254143 A1* | 9/2014 | Wansor | ......................... | 362/103 |

* cited by examiner

*Primary Examiner* — Peggy Neils
(74) *Attorney, Agent, or Firm* — Hankin Patent Law APC; Marc E. Hankin; Anooj Patel (57) ABSTRACT

An illumination device for or in combination with apparel or other worn garments by a rider of a motorcycle or scooter for enhancing recognition of the motorcycle's presence by proximate vehicles. The device features lighting components engaged upon or part of the clothing of the rider which illuminate the rider and human form in concert with one or more lights on the motorcycle. The resulting non constant illuminations provide a visual enhancement of the rider and motorcycle presence to adjacent drivers.

15 Claims, 4 Drawing Sheets

WIRELESS ILLUMINATED APPAREL

BACKGROUND OF THE INVENTION

1. Field of the Invention

The present invention relates generally to illuminated apparel. More particularly the invention relates to an illumination device for apparel or other worn garments to illuminate the user for improving the visibility of the user by others, especially when on a roadway. The device is configured with means for wireless communication to a remote communication source for syncing the illumination device with the remote communication source.

2. Prior Art

Safety is a major concern for many motorcycle riders and cycle riders both off the highway and especially on the highway and roads. A contributing factor of unsafe riding conditions lies in the limited visibility of the bike or motorcycle rider due to relatively small size of the motorcycle and rider, compared to larger passenger vehicles on the road. Additionally, car and truck drivers are inherently looking for other cars and trucks and not attuned to looking for motorcycle riders who may be riding in a parallel lane. Because they are not looking for a motorcycle or rider, and because of the relatively small size of a rider and motorcycle compared with a truck or car, drivers in passenger vehicles have difficulty spotting riders and their motorcycles when adjacent motorcyclist or during an approach to a forward positioned motorcyclist on the highway.

This lack of cognisance of the presence of a motorcyclist, and inherent inattention to their presence approaching a motorcyclist or adjacent thereto, can frequently cause car and truck drivers to incorrectly fail to anticipate a lane change by the motorcycle rider or the adjacent motorcycle rider passing their vehicle. Due to such inattention and a bias toward watching for larger vehicles, even when the rider has the small signal light on their motorcycle or scooter activated their presence and their changing lanes legally is frequently missed.

As such, the scooter or motorcycle rider can be riding with caution and legally passing and making legal lane changes with proper signaling, but can still be easily involved in a collision or other accident. For the car or truck driver striking a motorcycle and rider will have little effect and in some cases a glancing tap of the car against the motorcycle will actually be missed by the larger vehicle driver. However, for the unlucky motorcycle rider, who is riding and doing everything correctly, a tap of a car or truck, or a larger impact, can easily result in severe injury and even death.

As a result, conventional solutions to the problem generally revolve around making the motorcycle more visible to other drivers. In some states adding lighting to the motorcycle, or changing the lighting thereof is illegal and the rider is precluded from trying to increase visibility. In states where such is legal, proactive riders who value life and limb, tend to take action to increase visibility.

For example, the motorcycle may have extra lights engaged to all sides of the motorcycle fairings which are always illuminated. In addition, is it well known that some motorcycle headlights are always left illuminated when driving in both night and daylight conditions in order to make the rider and motorcycle more visible to adjacent drivers.

However, this conventional solution of illuminating the motorcycle may not be possible for users having smaller or customized motorcycles which do not facilitate the addition of a plurality of such lights. Many motorcycles and motor scooters lack sufficient electrical power and/or a suitable battery with sufficient power for maintaining such auxiliary lighting in an illuminated state.

As such, because some state prohibit lighting changes, and because many motor scooters and motorcycles will not support additional wattage required for extra lighting, in order to employ illumination as a means for making the motorcycle and rider more than a shadow in the perirhinal vision of car and truck drivers, the illumination of the rider, as opposed to the motorcycle, may provide a better solution to this problem. Such rider illumination would be especially advantageous since it is well known, that the human brain tends to more easily see and focus on, and thus naturally recognize, a human form. This cognisance of human form is known to be a reflex action due to the brain being hard wired to recognize and access the potential for an approaching friend or foe, more readily than the abstract shape of an adjacent or approaching motorcycle. Thus making the human form of the rider more easily viewed and/or ascertained by adjacent and approaching drivers will enhance this natural bias of the human mind to recognize the presence of another person in their proximity.

In addition, illuminated motorcycle rider helmets, such as U.S. Pat. No. 7,948,367, are known in the art which aim to try and make the motorcycle and rider more visible by illuminating headgear situated above the motorcycle. However the design of conventional helmets, and even those employing such illumination, tend to have a sleek and streamline shape, which strongly matches that of the motorcycle, rather than the human form. Further in the dark, the distance between the headgear and the motorcycle remains unlit, and does not provide a human form which is more easily visible. As can be easily ascertained, such helmets viewed by adjacent and approaching drivers who are biased toward looking for cars and trucks and the lighting thereon, are visually comparable with the abstract shape of the motorcycle, and thus similarly fail to provide the advantage of highlighting a human form, when illuminated.

As a result, there is a continuing unmet need for an illumination device for motorcycle, motor scooter, and even bicycle riders, which will enhance the projection of a human form to proximate car and truck drivers who are not mentally attuned to be on the lookout for cycle riders. Such a device should engage with apparel or other worn garments, to illuminate the wearing user in a manner that enhances their human form, whether as a stick-figure or otherwise, for improving the perception of their presence, and thus their visibility, to adjacent and approaching car and truck drivers.

In at least one preferred mode, the device should be adapted to engage with a rider to illuminate at least the limbs of the rider of a motor scooter or motorcycle. The device in this mode should advantageously provide a means for wireless communication with the lighting system of the motorcycle, thereby allowing the illuminated apparel device to provide an extension of the turn signaling (i.e. blinker), hazards, and/or braking system of the motorcycle, incorporated into the rider apparel. This electrical communication with the motorcycle lighting will also automatically deactivate the apparel lighting when the rider turns off the motorcycle so the rider need not accidently walk into a restaurant or the like in an illuminated fashion.

Such a device should advantageously provide a means for substantially illuminating and projecting for view to adjacent and approaching car and truck drivers, the human form, such as the legs the feet and/or arms and torso. Such a device should also be adapted to communicate with other wireless enabled remote communication sources, such as computers, handheld electronics, music players, and the like, allowing the user to sync the illumination device being worn, with the desired source.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of an illumination device for apparel or other worn garments employing suitable hardware and software adapted to the task of illumination and wireless communication. In some preferred modes, the illumination device is permanently engaged and is part of the apparel to provide an original equipment manufacturers (OEM) type product. However, other modes are envisioned wherein the illumination device is adapted for a removable engagement to existing apparel to allow users to retrofit, or wear their favorite clothing.

It is briefly noted that term 'apparel' used in this disclosure may be employed to mean various types of apparel suitable for illumination purposes, which may include however without implying limitations, shoes, boot, gloves, helmet, hat, shirt, pants, headband, and socks. As such, in some of the preferred modes, the device may specifically call out a desired apparel type to be employed, for example a shoe, however it is to be understood that the features and advantages described can be employed with other apparel types, for the purpose of illuminating a rider and highlighting the human form.

Further, it is additionally noted that upon a reading of this disclosure, those skilled in the art will recognize various means for carrying out the intended features of the invention. As such it is to be understood that other devices, methods, and system of components may be configured to carry out these features, and are considered to be within the scope and intent of the present invention, and are anticipated.

With that being said, in accordance with a first particularly preferred mode of the invention, an illumination device is provided which includes an illuminated shoe device having one or a plurality of illumination components, such as LED's, HID's, fluorescent, spot lights, strobe lights, colored lights, or the like for the purpose of illuminating a motorcycle rider as outlined previously. The device employs means for wireless communication with the electronics of the motorcycle, and more particularly the lighting, turn signal, hazard lighting, and/or braking systems of the motorcycle, such that one or a plurality of the illumination components of the device can be integrated as part of the lighting system of the motorcycle. It is noted that the terms 'lighting system', 'hazard lighting', 'braking system' and 'turn signal system' used herein may refer to specific electronics of the motorcycle as well as the electronic circuitry of the motorcycle as a whole which may control the appropriate sub-systems and related components. Optionally, the device may employ a proximity sensor such as a small radar or sonar transceiver, which will sense adjacent vehicles and their movement or vehicles closing on the motorcycle. Engaged with a microprocessor when the rider reaches a particular determined distance from another vehicle, the proximity sensor could cause a change in the lighting engaged to the rider, such as blinking, or lower and higher illumination patterns to catch the eye of the other motorist.

With that being said it is the intent of the current mode to provide an extension of the motorcycle and motor scooter lighting system, engaged to the apparel of the rider, which is in communication therewith to be activated to illuminate or change illumination. This can occur in an engagement on the riders shoes when signaling a turn, braking, illuminating hazard lights, and/or during emergency lighting such as for law enforcement officers. Extensions from the shoes up the legs, or on the arms and torso can also be employed. In addition, in at least one preferred mode the device is configured to substantially illuminate the human form, including illumination of the users feet and legs. This provides utility over conventional solutions of rider illumination which simply aim to illuminate the motorcycle, and not the rider.

In at least one preferred mode, the means for wireless communication between motorcycle and the device engaged with the rider, includes a receiver/transmitter and antenna configured for RF transmission via Bluetooth, wifi, near field communication (NFC), or other communication network suitable for the task of wireless communication with the motorcycle electronics. This may require the user to configure the motorcycle's electronics with a n interface or switch which energizes a transmitter and RF transceiver antenna, for the purpose of cooperatively and actively communicating with the device to cause or change the illumination on the rider. For example a remote wireless RF transceiver and antenna component intended for integration into the motorcycle electronics such as signal lighting and brake lights, is providable to the user, along with the device in a kit mode or as a sold separately product. In addition, other modes are envisioned wherein the transceiver for communication with the shoe device is built-in as part of the OEM motorcycle's circuitry.

In another mode, the device may employ optical sensors as a means for communicating the actions of the motorcycle lighting system to the activation circuit on the device engaged with the rider. These optical sensors, such as fiber optic cables leading to the lighting on the motorcycle from a switch or the transceiver, or, a sensing unit on the device on the rider, may be employed to sense the illumination of the motorcycles existing turn signals and/or brake lights. This can be done by sensing the wavelength of the turn signal and/or brake lights, and/or by optically sensing a blinking pattern of the signal lights, and the illumination of the brake for more than a minimum time. Once sensed, a switch on the device in communication with the lighting device herein on the rider, will provide activation of the illumination components on the shoe device, and or the legs, torso, and arms, to a synchronized pattern of illumination. Thus, in this mode, configuring the motorcycles existing circuitry for communication with the device is not required.

In accordance with at least one other particularly preferred mode of the invention, a removably engageable illumination device is provided. This mode of the device may allow the user to engage the illumination device to any garment or apparel for purposes of user illumination. The means for removable engagement to apparel, can include, however without implying limitations; clips, snaps, magnets, elastic bands, straps, or other suitable removable fastener. In this mode it is intended that the removably engageable device, including one or a plurality of illumination components, such as LED's, as well as the power source and other suitable hardware, are configured into a portable unit.

Further, it is intended that the device can be configured to communicate with various other remote communication sources, to provide a synchronized illumination. For example the device can be configured to communicate with the user computer or smartphone, via Bluetooth or the like, allowing the user to sync the LED illumination with the beat of a song. As another example, the removably engageable mode of the device can be sold or given away at a concert, and configured for communication with a DJ's computer having wireless communication means adapted for wireless communication with the device, to provide an interactive synchronized illumination of the device with the songs being played.

In another mode of invention a light system including wireless communication means is provided and adapted for engagement to a peddle bicycle. The system is preferably configured to communicate with the illuminated apparel device, thus, upon adapting a peddle bicycle with the light system, the user can employ the illuminated apparel device providing rider illumination during signaling, hazards, and braking.

In all modes the device can include a replaceable or rechargeable power source, such as a battery.

Finally, in another preferred mode, a proximity sensor on the motorcycle or scooter may be engaged to the rider or the motorcycle and which is adapted for sensing vehicles which become proximate to the motorcycle at a determined distance proximate to motorcycle. This determined distance may be immediately adjacent to on a side such as 5-10 feet, or to the front or rear of the motorcycle as a distance of for example fifteen feet or less which is a shorter length of a normal four-wheeled vehicle and puts the motorcycle in the position with an adjacent vehicle where normally another vehicle would be positioned. This is the zone where a collision can easily take place if the adjacent vehicle does not see the motorcycle and a good place and time to become momentarily more visible.

Once the proximity sensor is tripped by a vehicle in the determined distance it will communicate with the switch on the lights engaged with the rider and cause a secondary active on the rider. This proximity zone can also be a range of between 5 to 60 feet or more, depending on a sensed closing rate between the vehicle proximate or becoming proximate to the motorcycle and the motorcycle. The closing rate is determined by the speed of the vehicle becoming proximate to the motorcycle, and calculated time of contact, where the lights of the device are illuminated at the distance appropriate in the range, to give the approaching driver time to see the motorcycle. 16. The illumination device of claim 4 wherein said determined distanced is in a range between 5 and 60 feet of the motorcycle. In such case a vehicle bearing down upon the motorcycle sensed by the proximity sensor, would be flashed a warning at a distance calculated to give it time to slow down.

Operation of the proximity sensor would employ a sonar or small radar device with transmitter and receiver, such as those used conventionally on backup sensors and parking sensors for cars, can provide the proximity sensing. With software running on a small microprocessor, secondary switching to make the device lighting on the rider more visible can be activated if proximity becomes too close, or when the device senses the rider passing or being approached by a vehicle from behind.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 1:
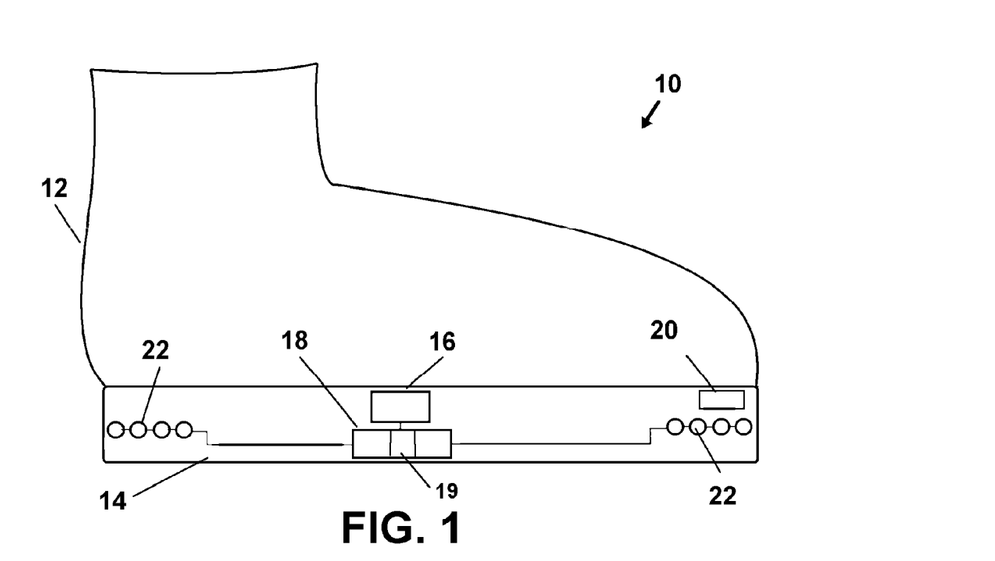
FIG. 1 shows a side view of a first particularly preferred mode of the illumination device providing illumination components, wireless receiver, and battery permanently engaged to a illuminated shoe device for illuminating the feet of a motorcycle rider.
Figure 2:
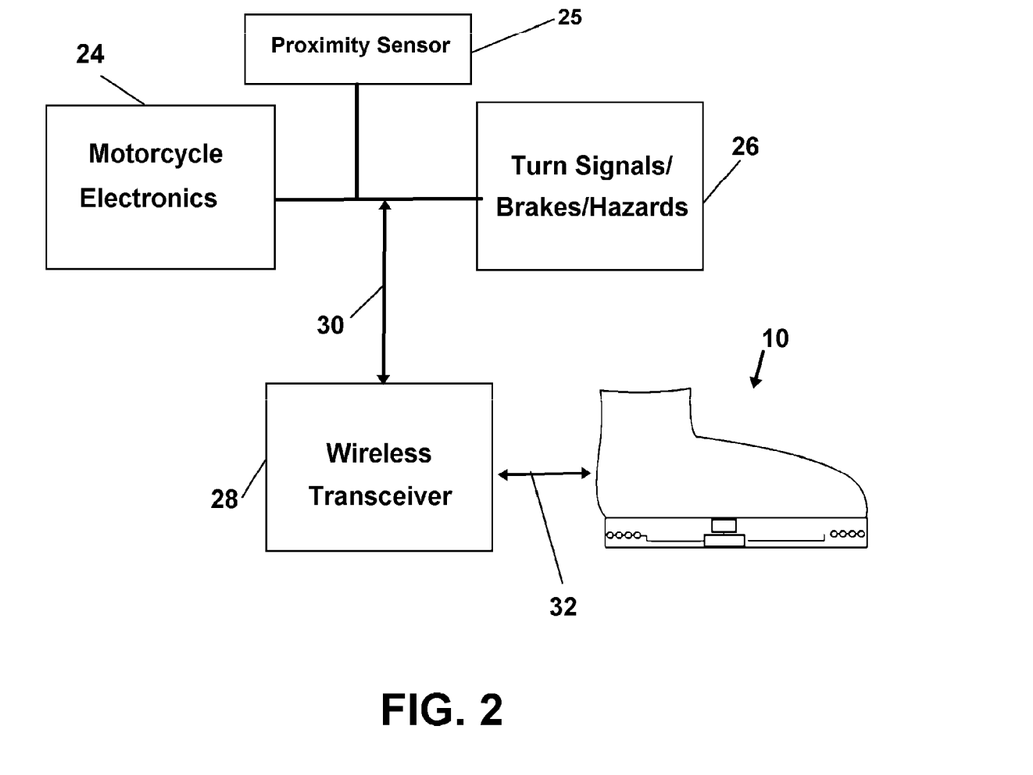
FIG. 2 shows a schematic drawing of the engagement of a wireless transceiver in communication with the electronics of a motorcycle providing the means for wireless communication with device of FIG. 1, and a proximity sensor for sensing vehicles.

Now referring to drawings in FIGS. 1-10, wherein similar components are identified by like reference numerals, there is seen in FIG. 1 and FIG. 2 a first particularly preferred mode of the invention providing an illumination device 10 in the form of an illuminated shoe 12 having one or a plurality of illumination components 22, such as LED's for the purpose of illuminating a motorcycle rider. The device 10 employs means for wireless communication which communicates the activation or deactivation of one or a combination of lights from a group of vehicle lights, including the signal lights, brake lights, headlights, daytime lights, hazard lights, or emergency vehicle colored lights, and related electronics 24 of the motorcycle, and more particularly the lighting and turn signal system 26 of the motorcycle or vehicle. In use, the illumination components 22 of the device 10 are therefor wirelessly integrated as part of the lighting system of the motorcycle for better illuminating the rider for improved rider visibility and safety. Where used with emergency vehicles such as police motorcycles, the activation or deactivation of the blue or other colored lights may trigger the device 10 to illuminate.

The means for wireless communication may comprise a transceiver and antenna 18, powered by a battery 16 or other suitable power source, which is configured for RF transmission via Bluetooth, wifi, near field communication (NFC) or other communication network operatively configured for wireless communication 32, of a sensed illumination of on or more of the various lights of motorcycle electronics 24. The wireless transceiver antenna 28 may be provided configured for an engagement 30 to the motorcycle electronics 24 using sensors or direct connections to any or all of the turn signal, brake light, and or hazard lights of the lighting systems 26, which when energized provide individual signals for wirelessly communicating 32 activation signals to activate a switching circuit 19 operated by a switch or microprocessor, which is operatively engaged to each of the different lights upon the device 10.

However, other modes are envisioned wherein the wireless transceiver and antenna 28 energize, to communicated individual activation and deactivation signals, when a signal is communicated from switches or sensors in electrical communication with the various operating lights of the lighting system 26. As each of the respective brake, signal, or running lights activates or deactivates, an engaged sensor or switch generates a signal which is communicated to the transceiver and antenna 28 which then transmits a wireless communication of the individual activation or deactivation signal of an individual lighting system.

The activation and deactivation signals transmitted for each occurrence, are received by the transceiver and engaged antenna 18 and electrically communicated to and interpreted by the switching circuit 19. The switching circuit 19 may have a microprocessor operatively engaged with software configured to activate all or different lights of the device 10, depending on the activation or deactivation signal received. Using the received activation or deactivation signals, the switching circuit 19 activates engaged switches to energize or de-energize the lights of the shoe device 10 or other and other lighting components of the device herein. As noted, the motorcycle mounted components herein may be included original component as part of the OEM motorcycle's circuitry.

In one preferred mode in the current depiction, the battery 16, a receiver or transceiver engaged to an antenna 18, and the switching component 19, and illumination components 22 are all operatively engaged to the sole portion 14 of the shoe 12, however it is to be understood these components can be engaged to any location on the shoe 12 as deemed suitable by the designer, and should not be considered limited by the depiction.

In another mode, it is envisioned that the device 10 may employ one or a plurality of optical sensors 20, and operatively engaged with a microprocessor or switching means, as an optical means for ascertaining illumination of the various motorcycle lights, such as with the turn signals 26. The optical sensor may be worn on the rider's back or helmet or other clothing if necessary. These optical sensors 20 may be employed to sense the illumination of the motorcycles existing turn signals 26 or brakes, by sensing the different color wavelengths emitted from the turn signal, hazard lights, and brake lights, and/or by sensing the timing of a blinking pattern of the signaling lights, and the duration of illumination of the brake light, and thereby providing an activation of the switching 27 to activate the illumination components 22 on the shoe device 10 to a synchronized pattern of illumination. Thus, in this mode, configuring the motorcycles existing circuitry with a wireless transmitter 28 for communication with the device 10 is not required.

It is noted and anticipated that although the device 10 is shown in its most simple form, various components and aspects of the device 10 may be differently shaped or slightly modified when forming the invention herein. As such those skilled in the art will appreciate the descriptions and depictions set forth in this disclosure or merely meant to portray illustrative examples of preferred modes within the overall scope and intent of the invention, and are not to be considered limiting in any manner.

Figure 3:
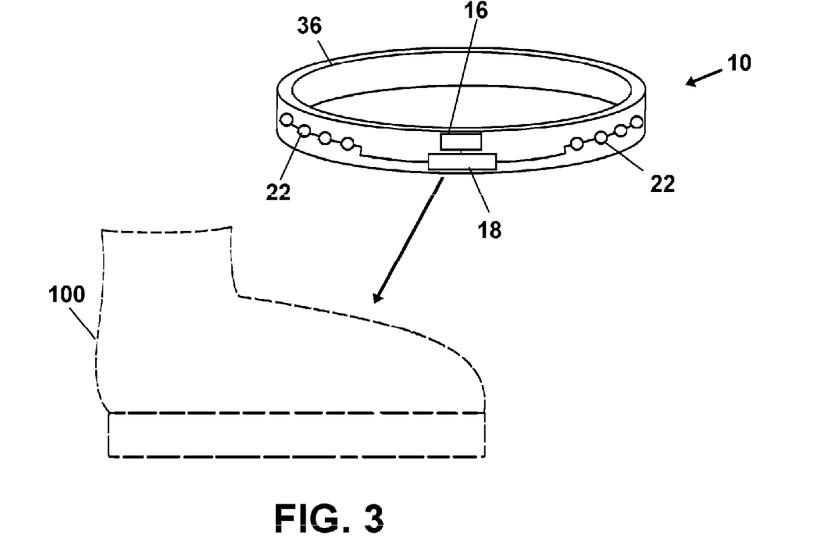
FIG. 3 shows a view of yet another particularly preferred mode of the invention providing a removably engageable illumination device in the form of an elastic band.
Figure 4:
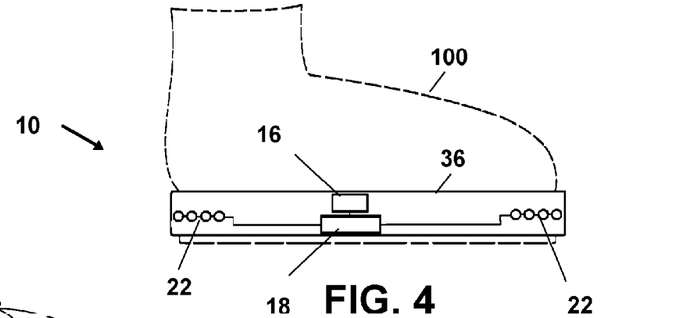
FIG. 4 shows the device of FIG. 3 engaged to a shoe.
Figure 5:
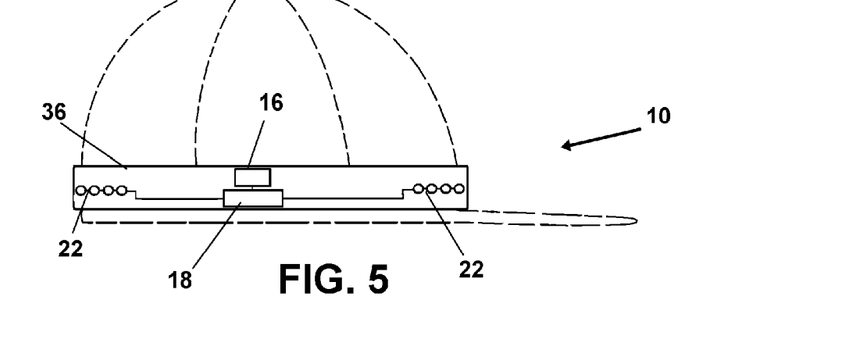
FIG. 5 shows the device of FIG. 3 engaged to a hat.

In accordance with another particularly preferred mode of the invention, and shown in FIG. 3-5, a removably engageable illumination device 10 is provided. In the current mode, the removably engageable illumination device 10 is provided by a band 36 having the antenna 18, battery 16, and illumination components 22 engaged thereto. This mode of the device 10 allows the user to engage the band 36 to any garment or apparel for purposes of user illumination. FIGS. 3 and 4 show particularly preferred as-used modes of the device 10, showing the band 36 being engaged to a user's existing shoe 100. FIG. 5 shows another as-used mode wherein the band 36 is engaged over a users hat 102.

The band 36 can be an elastic band, or have elastic portions adapted to be stretched and secured over the desired apparel in a frictional fit, however, it is noted that other means for removable engagement may be employed and are anticipated. This can include, however without implying limitations; clips, snaps, magnets, straps, hook and loop fastener, or other suitable removable fastener.

Figure 6:
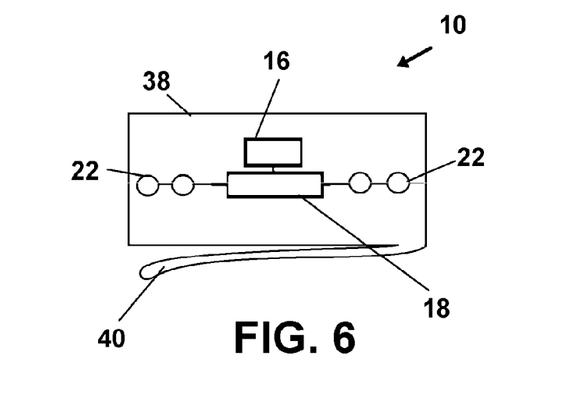
FIG. 6 shows a side view of yet another particularly preferred mode of the invention providing a removably engageable illumination device in the form of an clip-on device.
Figure 7:
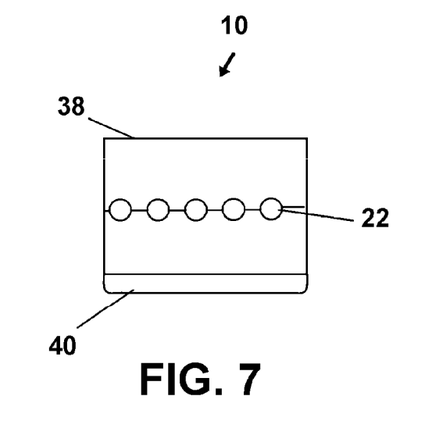
FIG. 7 shows a front view of the device of FIG. 6 showing additional illumination components.
Figure 8:
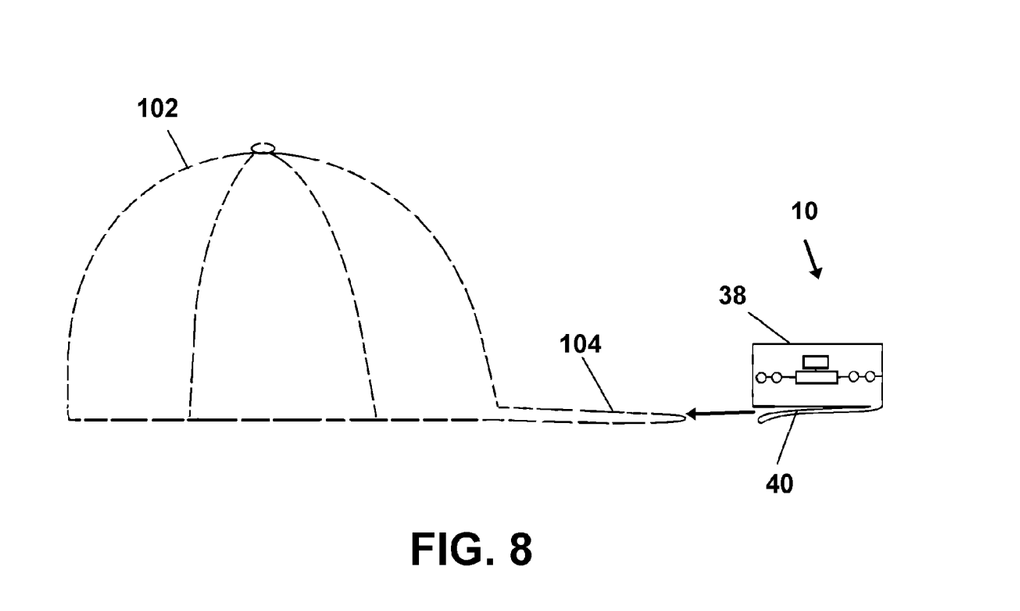
FIG. 8 shows a side view of the device of FIG. 6 adapted for a clip-on engagement to the bill of a hat.

FIG. 6-8 show yet another particularly preferred mode of the removably engageable illumination device 10 provided by a clip-on component 38 having a clip 40 for engagement to any desired apparel, including the bill 104 of a hat 102 (FIG. 8), a belt, belt loop, shirt collar, or other location deemed suitable by the user. This mode provides a compact transportable unit having the antenna 18 and battery 16 preferably enclosed within a sealed housing, and having the illumination components 22 exposed for user illumination as needed.

Further, it is intended that the device 10 in all modes can be configured to communicate with various other sources, to provide a synchronized illumination. For example the device 10 can be configured to communicate with a user's computer or smartphone, via Bluetooth or the like, allowing the user to sync the LED illumination with the beat of a song. As another example, the removably engageable mode of the device 10 can be sold or given away at a concert, and configured for wireless communication with a performers computer allowing the performer to carry out an interactive synchronized illumination of the device with the songs being played.

Figure 9:
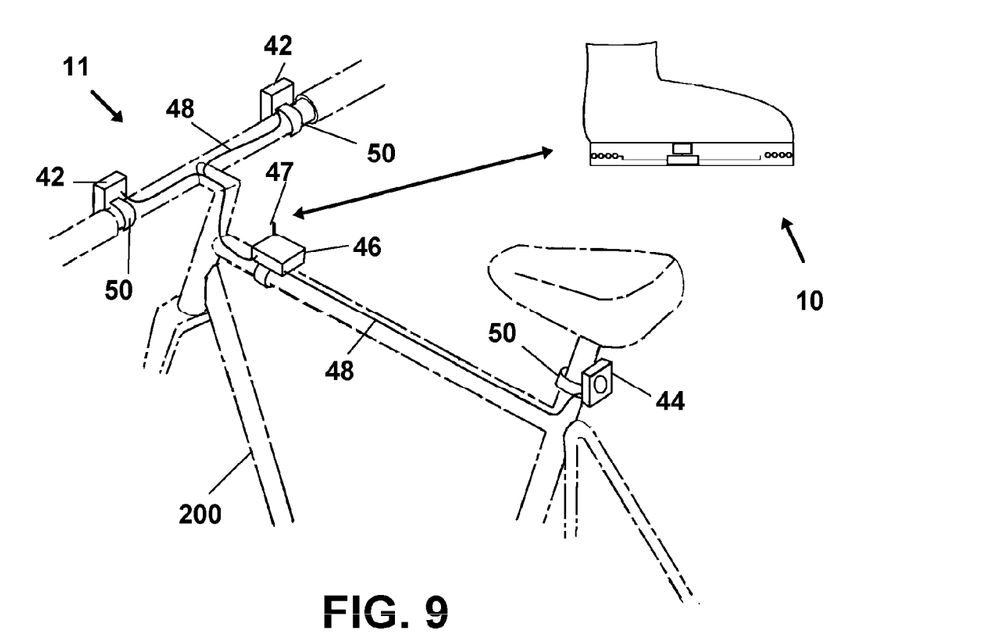
FIG. 9 shows another mode of the invention providing a turn and braking signal light system having wireless communication means, which is adapted for an engagement to a peddle bicycle, for communicating with the illumination device.

FIG. 9 shows another preferred mode of the invention, providing a turn and braking light system 11 adapted for an engagement to conventional peddle bicycle 200. The system 11 preferably includes one or a plurality of turn signal lights 42, one or a plurality of brake signal lights 44, and a control module 46. The control module 46 preferable includes a power source, such as a battery, and a means for wireless communication with the device 10, such as an RF antenna 47. The lights 42, 44 can be in a wired 48 or wireless communication with the control module 46. Further, straps 50 or other means for removable engagement employed on the lights 42, 44 and control module 46 as shown, are employed to allow the user to engage the system 11 to any conventional bicycle 200. The straps 50 can employ hook and loop fabric, or may be elastic for engaging to the various parts of the bicycle 200 as needed.

Figure 10:
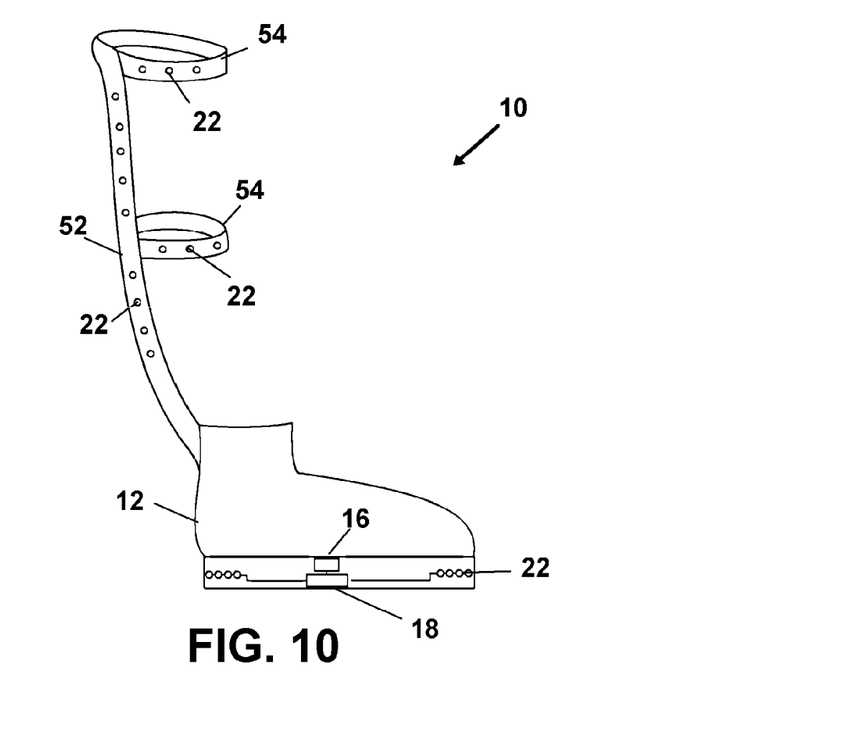
FIG. 10 shows another preferred mode of the device configured to more substantially illuminate the human form, through the provision of leg engageable illumination means.

FIG. 10 shows another mode of the device 10 providing leg engageable illumination means 52 including a plurality illumination components 22 engaged thereto. The leg engageable means 52 may include straps or bands 54 allowing the user to engage the leg engageable means 52 to their leg (not shown) for a secured removable engagement. However other means for removable engagement can be employed, for example hook and loop fasteners, clips, and the like. It is additionally noted and anticipated that in other modes the leg engageable means 52 can be permanently integrated into pants, shorts, or other garments. Further, other modes are envisioned wherein the leg engageable means 52 is removably engageable with the shoe 12, through a wired or wireless removable engagement such as an electronic fastener, or other suitable fastener means.

Finally, in another preferred mode, a proximity sensor 25 on the motorcycle or scooter or mounted on the rider's clothing can be employed. The proximity sensor 25 is similar in function to parking sensors used on many vehicles and may use sonar or radar to sense the presence and proximity of adjacent vehicles and the closing rate with the motorcycle or scooter. With software running on a small microprocessor engaged with the switching component 19, a switching of the various lights of the device 10 depending on what and where worn, can be activated, such as momentarily brighter or flashing of the lights or LED's or illumination components, to render the rider more visible if proximity becomes too close or a closing rate with another vehicle is sensed as too fast, or when the proximity sensor 25 acertains the rider passing or being approached by a vehicle from behind.

Thus, the current mode provides utility not yet accomplished in prior art by substantially illuminating the human form through the provision of illumination of the user's feet and legs, as opposed to the abstract shapes of the motorcycle or a conventional helmet.

This invention has other applications, potentially, and one skilled in the art could discover these. The explication of the features of this invention does not limit the claims of this application; other applications developed by those skilled in the art will be included in this invention.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. An illumination apparatus for apparel or other worn garments by a rider of a motorcycle or scooter, comprising;
    one or a plurality of illumination components engaged upon clothing of a rider;
    a power source in electrical communication with said illumination components through a switch;
    means for sensing a change in an illumination of one or a combination of lights, from a group of vehicle lights, including turn signal lights, brake lights, headlights, daytime lights, hazard lights, and emergency vehicle colored lights, on said motorcycle and electrically communicating a signal representative of said change;
    a light frequency sensor optically communicating with one one or a combination of lights, from a group of vehicle lights, including turn signal lights, brake lights, headlights, daytime lights, hazard lights, and emergency vehicle colored lights, on said motorcycle;
    a wireless receiver configured to receive a wireless communication representative of said change in illumination, said receiver in electrical communication with said switch to communicate said wireless communication thereto;
    said wireless receiver configured to receive said wireless communication representative of said change in illumination from said light frequency sensor;
    said switch activating to engage or disengage said illumination components with said power source depending upon the communicated said change in illumination communicated from said receiver, whereby said illumination components are energized for illumination or de-energized by a said change in illumination of said one or both of a turn signal light or brake light.

2. The illumination device of claim 1 wherein said means for wireless communication comprises:
    a radio transmitter and electrically engaged antenna and a switching component engaged with said radio transmitter, said switching component in an operative communication said illumination components.

3. The illumination device of claim 1 additionally comprising:
- a proximity sensor positioned upon one of said motorcycle or said rider;
- said proximity sensor adapted for sensing vehicles at a determined distance proximate to said motorcycle;
- said proximity sensor configured for communicating a proximity signal to said one of said wireless receiver or said switch upon a said vehicle achieving said determined distance; and
- said proximity signal received by said switch causing a secondary activation thereof to engage or disengage said illumination components with said power source.

4. The illumination device of claim 2 additionally comprising:
- a proximity sensor positioned upon one of said motorcycle or said rider;
- said proximity sensor adapted for sensing vehicles at a determined distance proximate to said motorcycle;
- said proximity sensor configured for communicating a proximity signal to said one of said wireless receiver or said switch upon a said vehicle achieving said determined distance; and
- said proximity signal received by said switch causing a secondary activation thereof to engage or disengage said illumination components with said power source.

5. The illumination device of claim 1 further comprising;
- said illumination components and said power source engaged to a shoe; and
- whereby said illumination components are energized for illumination or de-energized, to thereby render said shoe highly visible to proximate drivers of other vehicles.

6. The illumination device of claim 2 further comprising;
- said illumination components and said power source engaged to a shoe; and
- whereby said illumination components are energized for illumination or de-energized, to thereby render said shoe highly visible to proximate drivers of other vehicles.

7. The illumination device of claim 3 further comprising;
- said illumination components and said power source engaged to a shoe; and
- whereby said illumination components are energized for illumination or de-energized, to thereby render said shoe highly visible to proximate drivers of other vehicles.

8. The illumination device of claim 4 further comprising;
- said illumination components and said power source engaged to a shoe; and
- whereby said illumination components are energized for illumination or de-energized, to thereby render said shoe highly visible to proximate drivers of other vehicles.

9. The illumination device of claim 5 further comprising;
- leg-engaged said illumination components;
- whereby said rider has a stick figure human appearance upon an illumination of said illumination components rendering said rider more visible to proximate drivers of other vehicles.

10. The illumination device of claim 6 further comprising;
- leg-engaged said illumination components; and
- whereby said rider has a stick figure human appearance upon an illumination of said illumination components rendering said rider more visible to proximate drivers of other vehicles.

11. The illumination device of claim 7 further comprising;
- said illumination components also including leg engaged said illumination components; and
- whereby said rider has a stick figure human appearance upon an illumination of said illumination components rendering said rider more visible to proximate drivers of other vehicles.

12. The illumination device of claim 8 further comprising;
- said illumination components also including leg engaged said illumination components; and
- whereby said rider has a stick figure human appearance upon an illumination of said illumination components rendering said rider more visible to proximate drivers of other vehicles.

13. The illumination device of claim 3 wherein said determined distance is in a range between 5 and 60 feet of the motorcycle.

14. The illumination device of claim 4 wherein said determined distance is in a range between 5 and 60 feet of the motorcycle.

15. The illumination device of claim 13 wherein said proximity sensor calculates a closing rate of an approaching vehicle wherein said determined distanced is in a range between 5 and 60 feet of the motorcycle as a function of said closing rate.

* * * * *